US008606897B2

(12) United States Patent
Ferris et al.

(10) Patent No.: US 8,606,897 B2
(45) Date of Patent: Dec. 10, 2013

(54) SYSTEMS AND METHODS FOR EXPORTING USAGE HISTORY DATA AS INPUT TO A MANAGEMENT PLATFORM OF A TARGET CLOUD-BASED NETWORK (75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 349 days.

(21) Appl. No.: 12/790,415

(22) Filed: May 28, 2010

(65) Prior Publication Data

US 2011/0296000 A1 Dec. 1, 2011

(51) Int. Cl.
*G06F 15/173* (2006.01)
*G06F 15/16* (2006.01)
*G06Q 20/00* (2012.01)

(52) U.S. Cl.
USPC ............. 709/223; 709/226; 709/227; 705/80

(58) Field of Classification Search
None
See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 8,250,215 B2 * | 8/2012 | Stienhans et al. | 709/227 |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |

(Continued)

OTHER PUBLICATIONS

Morgan, "Systems and Methods for Generating Optimized Resource Consumption Periods for Multiple Users on Combined Basis", U.S. Appl. No. 13/037,359, filed Mar. 1, 2011.

(Continued)

*Primary Examiner* — Wen-Tai Lin
(74) *Attorney, Agent, or Firm* — Lowenstein Sandler LLP (57) ABSTRACT Embodiments relate to systems and methods for exporting usage history data as input to a management platform of a target cloud-based network. A usage export service can be abstracted and provided external to a host cloud-based network, which can capture the usage history of software or resources by one or more users in the host cloud-based network. Those user(s) or others may wish to export some or all of the usage history to a target cloud or clouds, to perform management or configuration actions in the target cloud(s). The selective subset of the usage history can be transmitted to the cloud management system of the target cloud-based network. The selective subset can be used for management actions in the target cloud(s), such as for instance, to instantiate or configure a set of virtual machines for failover or re-clouding purposes, or to aggregate usage history from the host and target cloud(s).

18 Claims, 6 Drawing Sheets

(56) References Cited

U.S. PATENT DOCUMENTS

| | | |
|---|---|---|
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1 | 9/2010 | Wei |
| 2010/0250746 A1* | 9/2010 | Murase ............... 709/226 |
| 2010/0299366 A1 | 11/2010 | Stienhans et al. |
| 2011/0016214 A1 | 1/2011 | Jackson |
| 2011/0022812 A1* | 1/2011 | van der Linden et al. .... 711/163 |
| 2011/0055377 A1* | 3/2011 | Dehaan ............... 709/224 |
| 2011/0131335 A1 | 6/2011 | Spaltro et al. |
| 2011/0137805 A1* | 6/2011 | Brookbanks et al. ......... 705/80 |

OTHER PUBLICATIONS

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

Ferris, et al., "Systems and Methods for Cominatorial Optimization of Multiple Resources Across a Set of Cloud-Based Networks", U.S. Appl. No. 12/953,718, filed Nov. 24, 2010.

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods fnr Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

"rBuilder and the rPath Appliance Platform", 2007 rPath, Inc., www.rpath.com, 3 pages.

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

DeHaan et al., "Methods and Systems for Flexible Cloud Management with Power Management Support", U.S. Appl. No. 12/473,987, filed May 28, 2009.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, filed May 27, 2009.

(56) References Cited

OTHER PUBLICATIONS

DeHaan at al., "Systems and Methods for Power Management in Managed Network Having Hardware-Based and Virtual Reources", U.S. Appl. No. 12/475,448, filed May 29, 2009.
Ferris, "Methods and Systems for Providing a Universal Marketplace for Resources for Delivery to a Cloud Computing Environment", U.S. Appl. No. 12/475,228, filed May 29, 2009.
DeHaan, "Methods and Systems for Abstracting Cloud Management", U.S. Appl. No. 12/474,113, filed May 28, 2009.
DeHaan, "Methods and Systems for Automated Scaling of Cloud Computing Systems", U.S. Appl. No. 12/474,707, filed May 29, 2009.
DeHaan, "Methods and Systems for Securely Terminating Processes in a Cloud Computing Environment", U.S. Appl. No. 12/550,157, filed Aug. 28, 2009.
DeHaan et al., "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris at al., "Methods and Systems for Pricing Software Infrastructure for a Cloud Computing Environment", U.S. Appl. No. 12/551,517, filed Aug. 31, 2009.
Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Monitoring Cloud Computing Environments", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris at al., "Methods and Systems for Verifying Software License Compliance in Cloud Computing Environments", U.S. Appl. No. 12/627,643, filed Nov. 30, 2009.
Ferris at al., "Systems and Methods for Service Aggregation Using Graduated Service Levels in a Cloud Network", U.S. Appl. No. 12/628,112, filed Nov. 30, 2009.
Ferris et al, "Methods and Systems for Generating a Software License Knowledge Base for Verifying Software License Compliance in Cloud Computing Environments", U.S. Appl. No. 12/628,156, filed Nov. 30, 2009.
Ferris at al., "Methods and Systems for Converting Standard Software Licenses for Use in Cloud Computing Environments", U.S. Appl. No. 12/714,099, filed Feb. 26, 2010.
Ferris at al., "Systems and Methods for Managing a Software Subscription in a Cloud Network", U.S. Appl. No. 12/714,096, filed Feb. 26, 2010.
Ferris at al., "Methods and Systems for Providing Deployment Architectures in Cloud Computing Environments", U.S. Appl. No. 12/714,427, filed Feb. 26, 2010.
Ferris at al., "Methods and Systems for Matching Resource Requests with Cloud Computing Environments", U.S. Appl. No. 12/714,113, filed Feb. 26, 2010.
Ferris at al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris at al., "Systems and Methods for or a Usage Manager for Cross-Cloud Appliances", U.S. Appl. No. 12/714,334, filed Feb. 26, 2010.
Ferris at al., "Systems and Methods for Delivery of User-Controlled Resources in Cloud Environments Via a Resource Specification Language Wrapper", U.S. Appl. No. 12/790,294, filed May 28, 2010.
Ferris at al., "Systems and Methods for Managing Multi-Level Service Level Agreements in Cloud-Based Networks", U.S. Appl. No. 12/789,660, filed May 28, 2010.
Ferris at al, "Methods and Systems for Generating Cross-Mapping of Vendor Software in a Cloud Computing Environment", U.S. Appl. No. 12/790,527, filed May 28, 2010.
Ferris at al., "Methods and Systems for Cloud Deployment Analysis Featuring Relative Cloud Resource Importance", U.S. Appl. No. 12/790,366, filed May 28, 2010.
Ferris at al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris at al., "Systems and Methods for Aggregate Monitoring of Utilization Data for Vendor Products in Cloud Networks", U.S. Appl. No. 12/790,039, filed May 28, 2010.
Morgan, "Systems and Methods for Detecting Resource Consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud Installation Information Using Cloud-Aware Kernel of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.

* cited by examiner

SYSTEMS AND METHODS FOR EXPORTING USAGE HISTORY DATA AS INPUT TO A MANAGEMENT PLATFORM OF A TARGET CLOUD-BASED NETWORK

FIELD

The invention relates generally to systems and methods for exporting usage history data as input to a management platform of a target cloud-based network, and more particularly, to platforms and techniques for providing a usage export service configured to capture, manage, and export the usage history of software or services by one or more users in a host cloud to a target cloud-based network.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent clouds to support the user's cloud deployment. That user may further instantiate and use multiple applications or other software or services inside or across multiple of those cloud boundaries, and those resources may be used or consumed by multiple or differing end-user groups in those different cloud networks.

As such, users or operators who wish to capture the usage history of their diverse cloud-based application deployments, and potentially export the usage history data between two or more clouds, may be confronted with various difficulties. As one complicating factor, the user may need to independently contact or register with cloud management systems in each cloud across which they wish to share usage history data. A user or operator may, for instance, arrange for a backup cloud-based network for purposes of fail-over operation, and/or to stand in reserve to "re-cloud" the resources of the user's population of virtual machines if those machines have reach capacity limits of the host cloud. In other cases, the user or administrator may wish to aggregate the usage histories of a host cloud with one or more target clouds. However, in existing platforms the cloud management system(s) of the target cloud or clouds may have no direct channel or technique to extract the usage history of the host or originating cloud.

Each of the host and target cloud management systems which support the user's cloud networks may in fact have different communication protocols, security requirements, application programming interfaces (APIs), and/or other specifications, standards, or formats. An administrator attempting to organize and export the usage activity or related record of a host cloud to one or more target clouds (which with the user may or may not already be registered) may therefore have to manually configure the connection or data to be able to compatibly communicate with the cloud management system(s) or other management platform(s) located in individual target clouds. It may be desirable to provide systems and methods for exporting usage history data as input to a management platform of a target cloud-based network, in which users based in a host cloud or clouds can access an external service to access usage history data in a host cloud, filter and convert that data, and export the resulting usage history data or selective subsets of that data from the host cloud deployment to remote management platforms of other clouds.

DESCRIPTION

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 (for example, one or more of servers 1 to x, 1 to y, or 1 to z, as shown) can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

Figure 1:
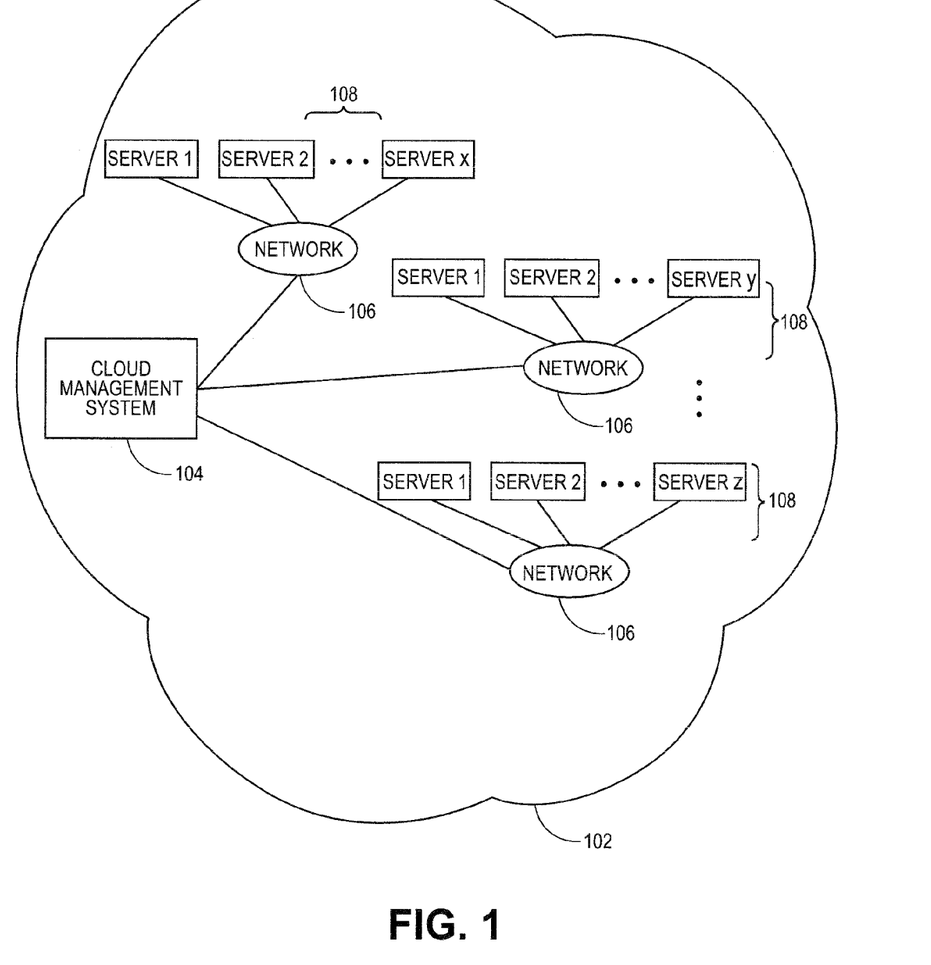
FIG. 1 illustrates an overall cloud system architecture in which various aspects of systems and methods for exporting usage history data as input to a management platform of a target cloud-based network can be practiced, according to embodiments.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources.

For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
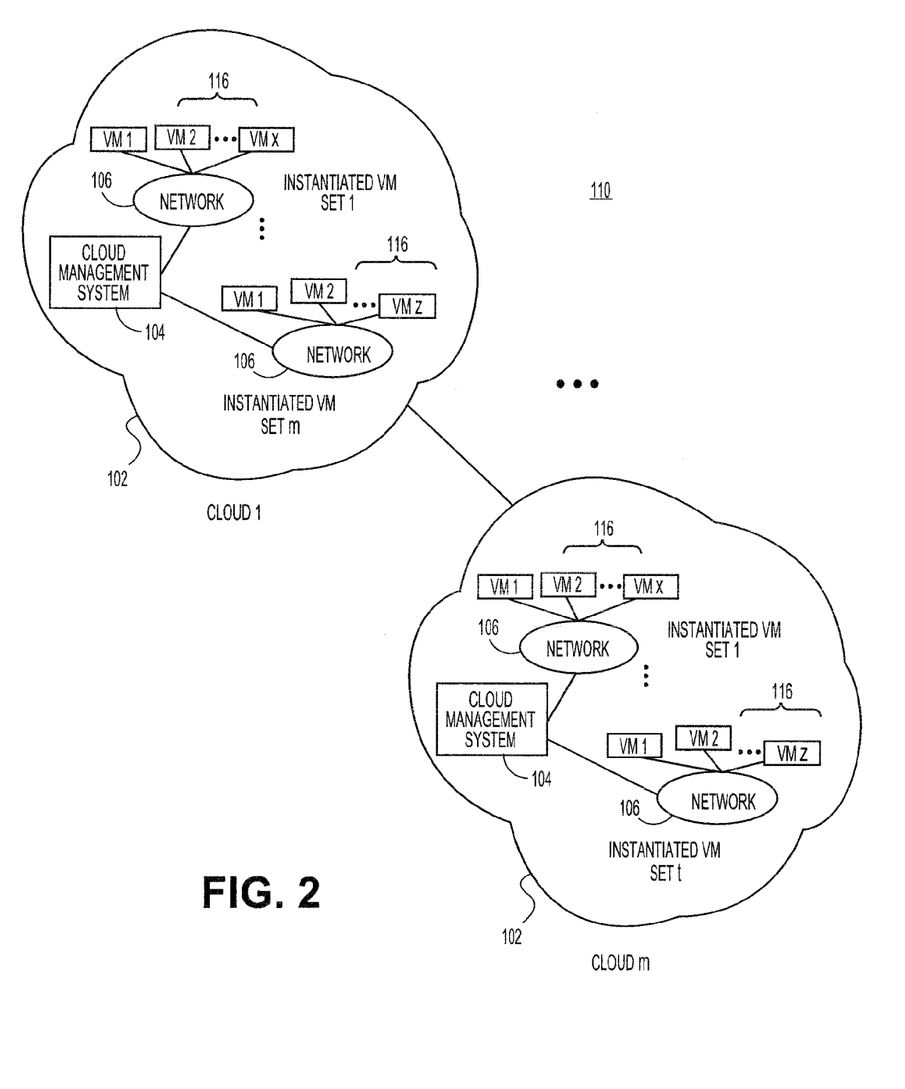
FIG. 2 illustrates an overall cloud system architecture in which various aspects of systems and methods for exporting usage history data as input to a management platform of a target cloud-based network can be practiced, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interface, via an application server such as a Java™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

Figure 3:
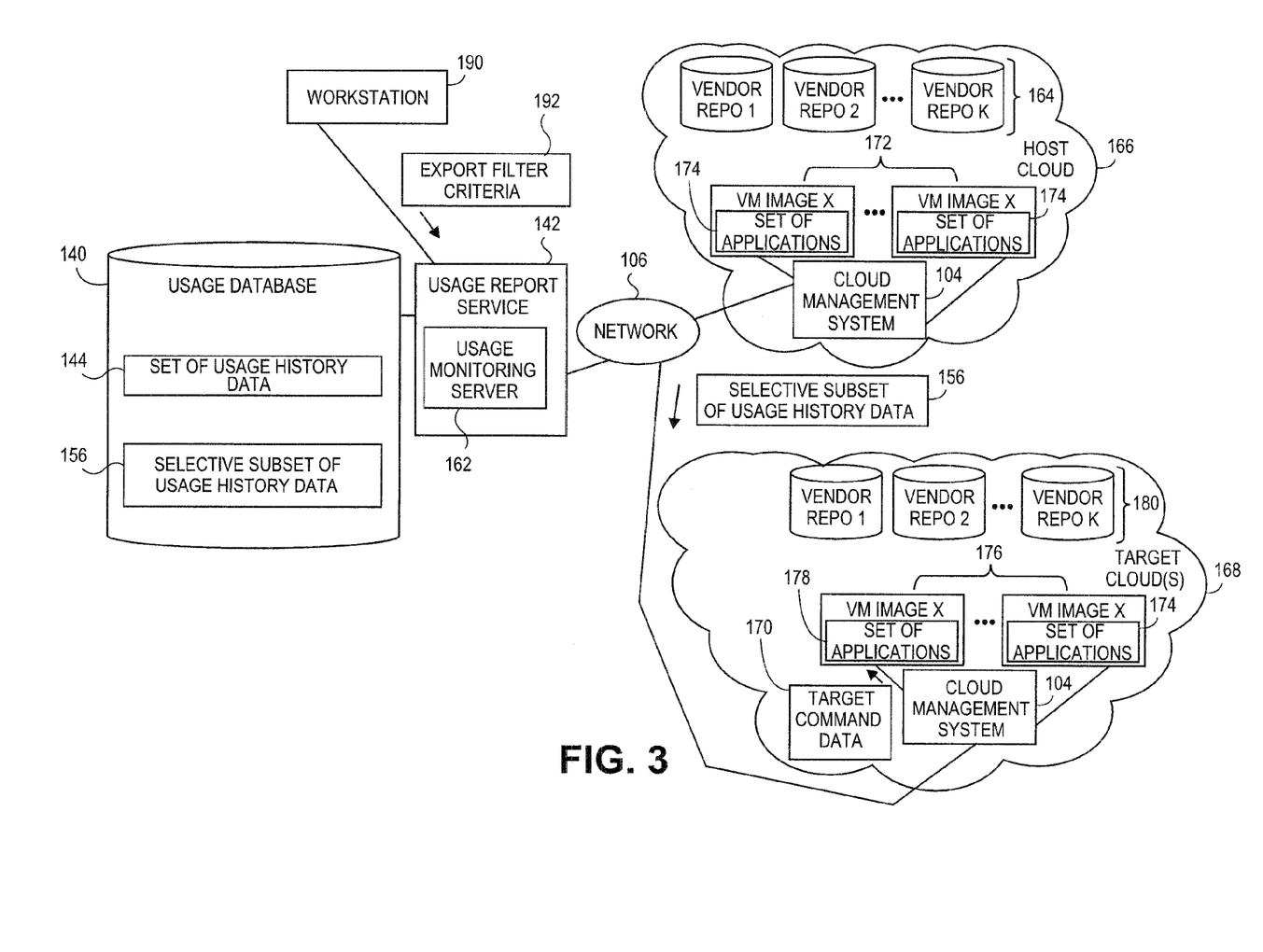
FIG. 3 illustrates a network configuration in which a usage export service, usage database, and other resources can interact with a set of cloud management systems and host and target clouds, to perform various cloud usage history exporting functions across cloud sets, according to various embodiments.

FIG. 3 illustrates an illustrative network configuration in which systems and methods for exporting usage history data as input to a management platform of a target cloud-based network can be implemented, according to various embodiments. In embodiments as shown, a user can maintain and operate a set of host virtual machines 172 in a host cloud 166. The set of host virtual machines 172 can execute a set of host applications 174, which can be or include any of a variety of applications, such as messaging, media, database, email, or other applications. The set of host applications 174 can be provisioned by or accessed from a set of host vendor repositories 180, and/or other sources. The set of host virtual machines 172 can be supported or operated by a cloud management system 104 exposed to the set of host virtual machines 172 and other resources of the host cloud 166. In aspects, the cloud management system 104 of the host cloud 166 and/or other logic can capture and store a set of usage history data set of usage history data 144 reflecting the consumption of software, hardware, communications, and/or other resources by the set of host virtual machines 172 while executing the set of host applications 174 and/or other applications, software, or operations in the host cloud 166.

In aspects as shown, the set of usage history data 144, once captured, can be transmitted from the host cloud 166 to a usage export service 142, which can be located external to the host cloud 166. The usage export service 142 can, in embodiments, be supported or implemented by a usage monitoring server 162, which can be configured to perform usage history management operations as described herein. The usage export service 142 can, in embodiments, operate under the control of an administrator or other user operating a workstation 160 or other console or machine. It may be noted that while embodiments are shown in which the usage export service 142 operates under the control of a user operating the workstation 160, some or all of the operations carried out by the usage monitoring service 142 can also or instead operate automatically under programmed control, without requiring user input. Other configurations of the usage export service 142 are possible.

In embodiments as shown, the usage export service 142 can interact with the cloud management system 104 of the host cloud 166, and receive the set of usage history data set of usage history data 144 reflecting the consumption of hardware, software, communications, and/or other resources by the set of host virtual machines 172. In embodiments, the set of usage history data 144 can be transmitted to the usage export service 142 based on a request or command from the usage export service 142 to the cloud management system 104 of the host cloud 106, on a pull or demand basis. In embodiments, the set of usage history data 144 can be transmitted to the usage export service 142 on a push basis from the cloud management system 104 of the host cloud 106 based on a predetermined schedule, or other triggering event. Once received by the usage export service 142, the usage export service 142 can store the set of usage history data 144 to a usage database 140, such as a local or remote database or other data store. The usage database 140 can store the set of usage history data 144 for one or more clouds over any desired period or periods.

The usage monitoring service 142 can thereby build a record in the form of set of usage history data 144 of the consumption of resources of the set of host virtual machines 172 over a period of time in the host cloud 166. The usage monitoring service 142 can, in aspects, generate an export or transmission of the set of usage history data 144, and/or a selective subset of the usage history data 156, to a one or more target clouds 168 as input to a management platform in that one or more target clouds 168. In aspects, the management platform can be or include a cloud management system 104, or in addition or instead can be or include a network management platform, such as the func (Fedora unified network controller) platform available from Red Hat, Inc., Raleigh, N.C., or others. In aspects, the usage export service 142 can build and transmit the set of usage history data 144 and/or selective subset of the usage history data 156, whether the user of the set of host virtual machines 172 is already registered to the one or more target clouds 168, or not. The delivery of the set of usage history data 144 and/or the selective subset of the usage history data 156 to the cloud management system 104 of the one or more target clouds 168 can permit the management of a set of target virtual machines 176 to alter or adapt the configuration of those machines, and take other management actions, based directly or indirectly on that data, as described herein.

In embodiments, the administrator, operator, or other user of the set of host virtual machines 172 can select or filter a subset of the set of usage history data 144 they wish to export to the one or more target clouds 168 as the selective subset of the usage history data 156. In aspects, the user can input or transmit a set of export filter criteria 158 to the usage export service 142 to provide a set of criteria, fields, and/or other data or parameters by which they wish to reduce or filter the set of usage history data 144 to generate the selective subset of the usage history data 156. In aspects, the user may wish to apply the export filter criteria 158 to reduce the size of the transmitted data and/or the transmission overhead for that data, as well as to extract subsets of the set of usage history data 144 that may be most directly useful or needed to configure or operate the set of target virtual machines 176 and/or set of target applications 178 operating in the one or more target clouds 168. The set of target applications 178 can be provisioned or accessed from a set of target repositories 180 and/or other sources. In aspects, the selective subset of the usage history data 156 and associated data can be used by the cloud management system 104 of the one or more target clouds 168 to generate a set of target command data 176 to instantiate, configure, suspend, update, and/or otherwise manage the set of target virtual machines 176. The set of export filter criteria 158 can, for instance, specify that the user wishes to capture and export all data in set of usage history data 144 related to the use of "Application A" over a period from "Date 1" to "Date 2", or can, for further instance, specify that the user wishes to export all data in set of usage history data 144 for "User Group A" or other identified sets or classes of users. In aspects, the export filter criteria 158 can specify additional or other fields, data types, or criteria.

In aspects, the export filter criteria 158 can be configured or specified to match the management operations, which can as noted be effected via the set of target command data 176, which are intended to be carried out on the set of target virtual machines 176. For instance, the export filter criteria 158 can be configured to extract overall usage patterns in the set of usage history data 144 so that the set of target virtual machines 176 can serve as a fail-over or backup network, in the event of the large-scale or systematic failure of the set of host virtual machines 172. In such cases, the selective subset of the usage history data 156 can reflect the overall processing, bandwidth, software, and/or other consumption of the set of host virtual machines 172, so that the set of target virtual machines 176 can be configured, instantiated, and/or prepared for instantiation based on detected failure events in the host cloud 166. It may be noted that the selective subset of the usage history data 156 generated by applying the export filter criteria 158 to the set of usage history data 144 can be stored by the usage export service 142 to the usage database 140, and/or other local or remote storage.

In terms of the filtering or reduction of set of usage history data 144, it may be noted that for further instance, the export filter criteria 158 can be configured to capture and extract virtual machine utilization information for the set of host virtual machines 172, to determine whether a capacity overload may exist or be imminent in the host cloud 166, and therefore prepare the set of target virtual machines 176 to provide supplemental capacity to the host cloud 166, on a demand basis. For yet further instance, the export filter criteria 158 can be configured to specify various combinations of applications in the set of host applications 174 to model the expected usage patterns of a similar deployment to be effected in the one or more target clouds 168, for example to expand a financial or engineering project to include more user classes groups. Other types of configuration can be performed in the one or more target clouds 168, and/or the set of target virtual machines 176 hosted in the one or more target clouds. It may be noted that in embodiments, the set of usage history data 144 can be transmitted to the cloud management system 104 of the one or more target clouds 168 without reduction or filtering, if desired.

Figure 4:
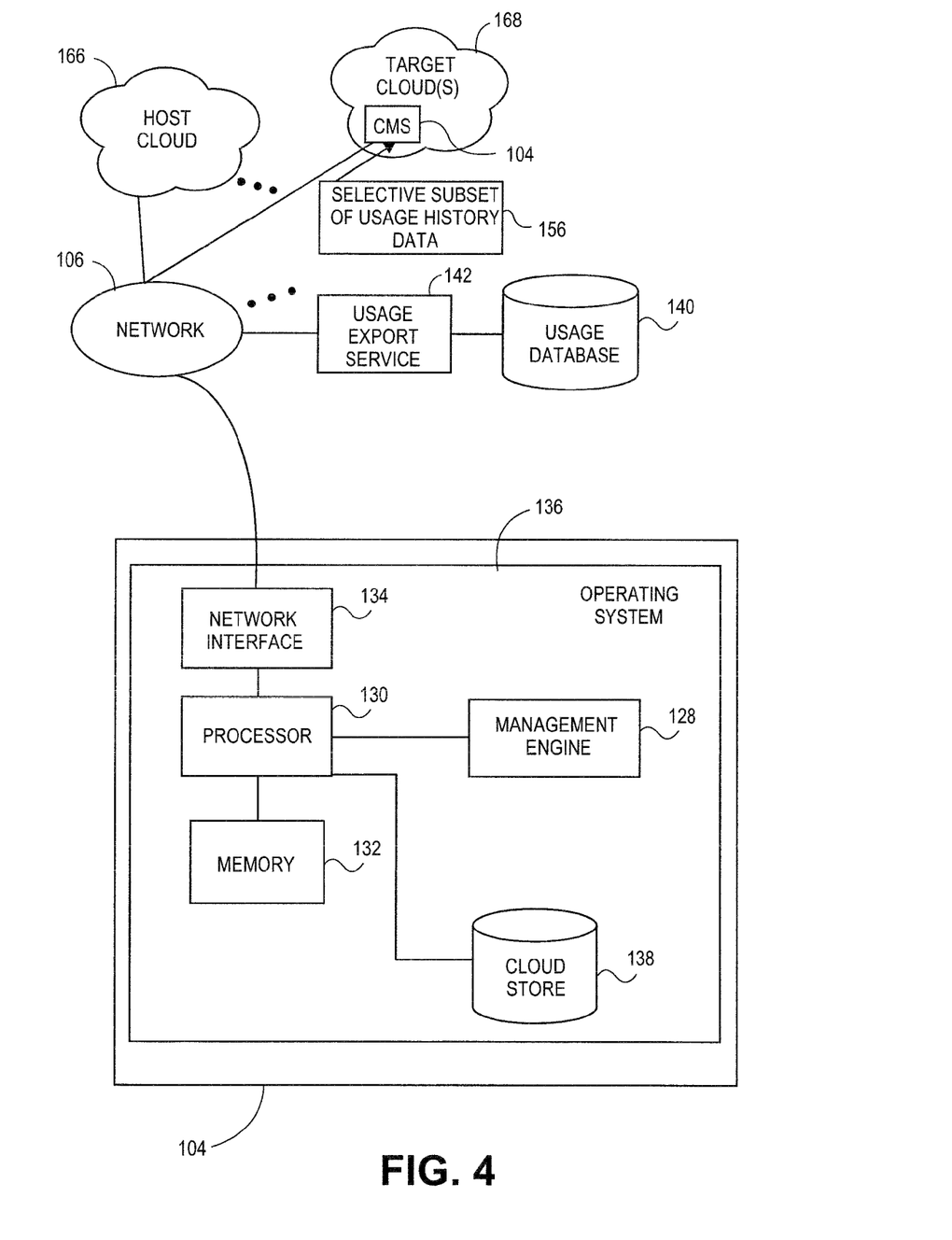
FIG. 4 illustrates an exemplary hardware configuration for a cloud management system that can support and maintain one or more cloud-based networks, according to various embodiments.

FIG. 4 illustrates an exemplary diagram of hardware and other resources that can be incorporated in a cloud management system 104 configured to communicate with the set of instantiated virtual machines 116, the set of host virtual machines 172, the set of target virtual machines 176, and/or other entities, services, or resources via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a cloud store 138, such as a database stored on a local hard drive, and a management engine 128, to execute control logic and control the operation of virtual machines and other resources in one or more clouds 102, host cloud 166, one or more target clouds 168, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with the usage export service 142 via one or more networks 106, as well as the usage database 140, the set of host virtual machines 1166, the set of host applications 174, the set of target virtual machines 176, the set of target applications 178, and/or other network resources in any one or more cloud in the host cloud 166 and/or one or more target clouds 168. Other configurations of the cloud management system 104, associated network connections, and other hardware, software, and service resources are possible. It may be noted that in embodiments, the usage monitoring server 162 and/or other hardware platforms or engines can comprise the same or similar resources as cloud management system 104, or can be configured with different hardware and software resources.

Figure 5:
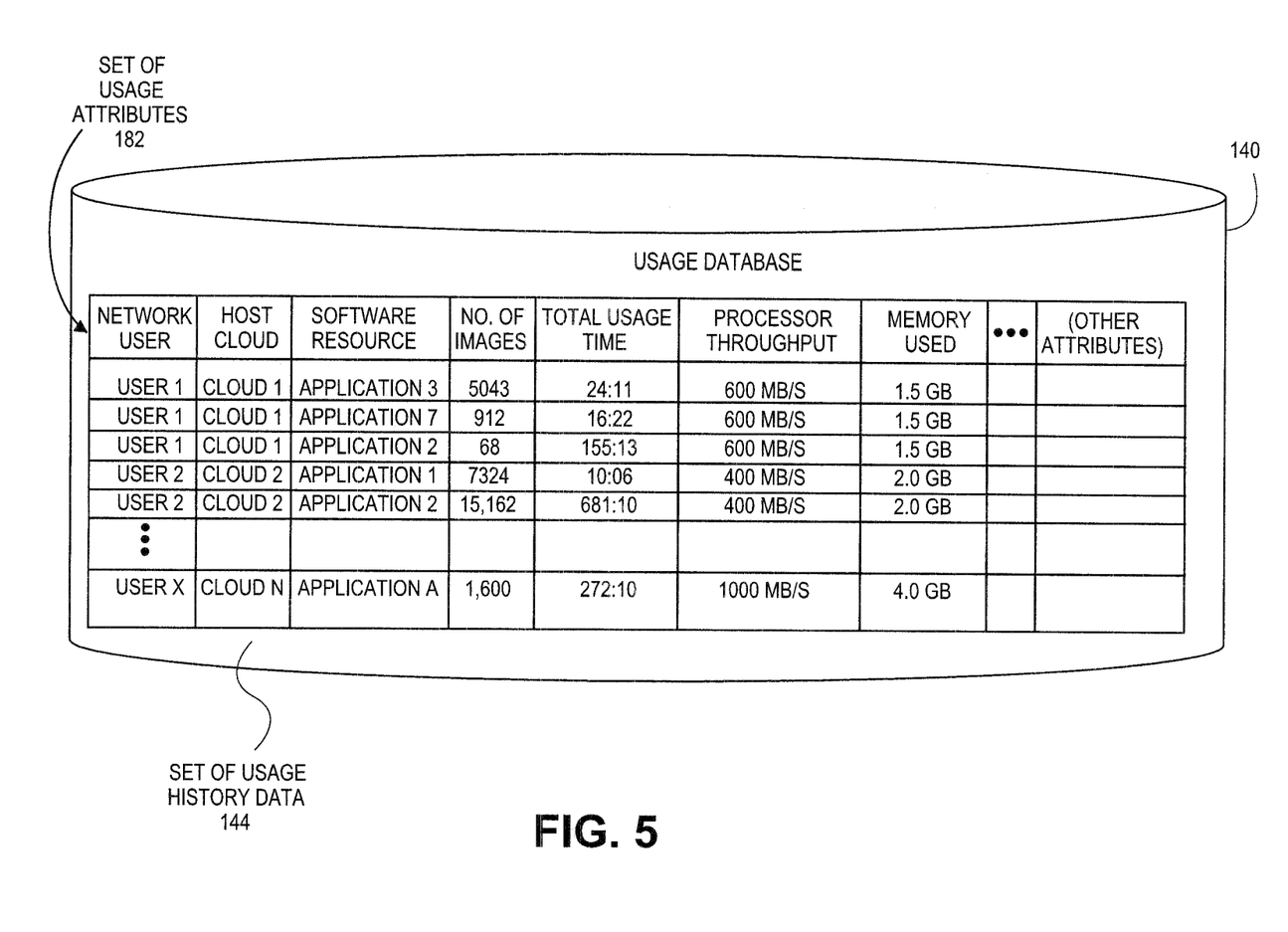
FIG. 5 illustrates an exemplary data structure in a monitoring database that can store usage-related information for users operating software applications and consuming or using other cloud software or hardware resources, according to various embodiments.

FIG. 5 illustrates an exemplary data structure in which the set of usage history data 184 and/or other associated information can be encoded and stored in the usage database 140 or other data store, according to various aspects. In aspects as shown, the set of usage history data set of usage history data 144 can include and be organized using a set of usage attributes 182, for instance, organized as keys or columns recording various attributes of the usage history of the set of host virtual machines 172, the set of host applications 174, and/or other executable software resources hosted in the host cloud 166, the one or more target clouds 168, and/or other network elements. In aspects, the set of usage history data set of usage history data 144 can be recorded in a flat and/or relational database, as shown. When encoded as a relational database, the set of usage history data set of usage history data 144 can be organized around, for instance, a user ID field as a key field or first column in the set of usage attributes 182. When stored in a relational format with a key field or first column reflecting a user ID, the set of usage history data set of usage history data 144 can be further sorted based within user IDs to generate an order based on, for example, a given user's set of host applications 174 whose use was captured in the host cloud 166, as shown. The captured usage data for a given user can in addition or instead be organized or sorted on other attributes in the set of usage attributes 182, such as, for instance, based on elapsed usage time, number of application images or other instances, applicable operating system, end-user identities or groups of identities, and/or based on other single or joint attributes, criteria, or filters. In aspects as noted, filtering operations on the set of usage history data set of usage history data 144 can be carried out by applying the set of export filter criteria 158 received from a user and/or obtained from a service, application, and/or other automated or programmed source to the selective subset of usage history data 156 and/or other output. In aspects, the usage database 140 can be, include, or access a SQL (structured query language) database engine, and the selective subset of the usage history data 156 can be generated using queries received or executed in that protocol, or others. Other types, configurations, and formats of data can be used in the usage database 140, the set of usage history data set of usage history data 144, and/or other associated information.

Figure 6:
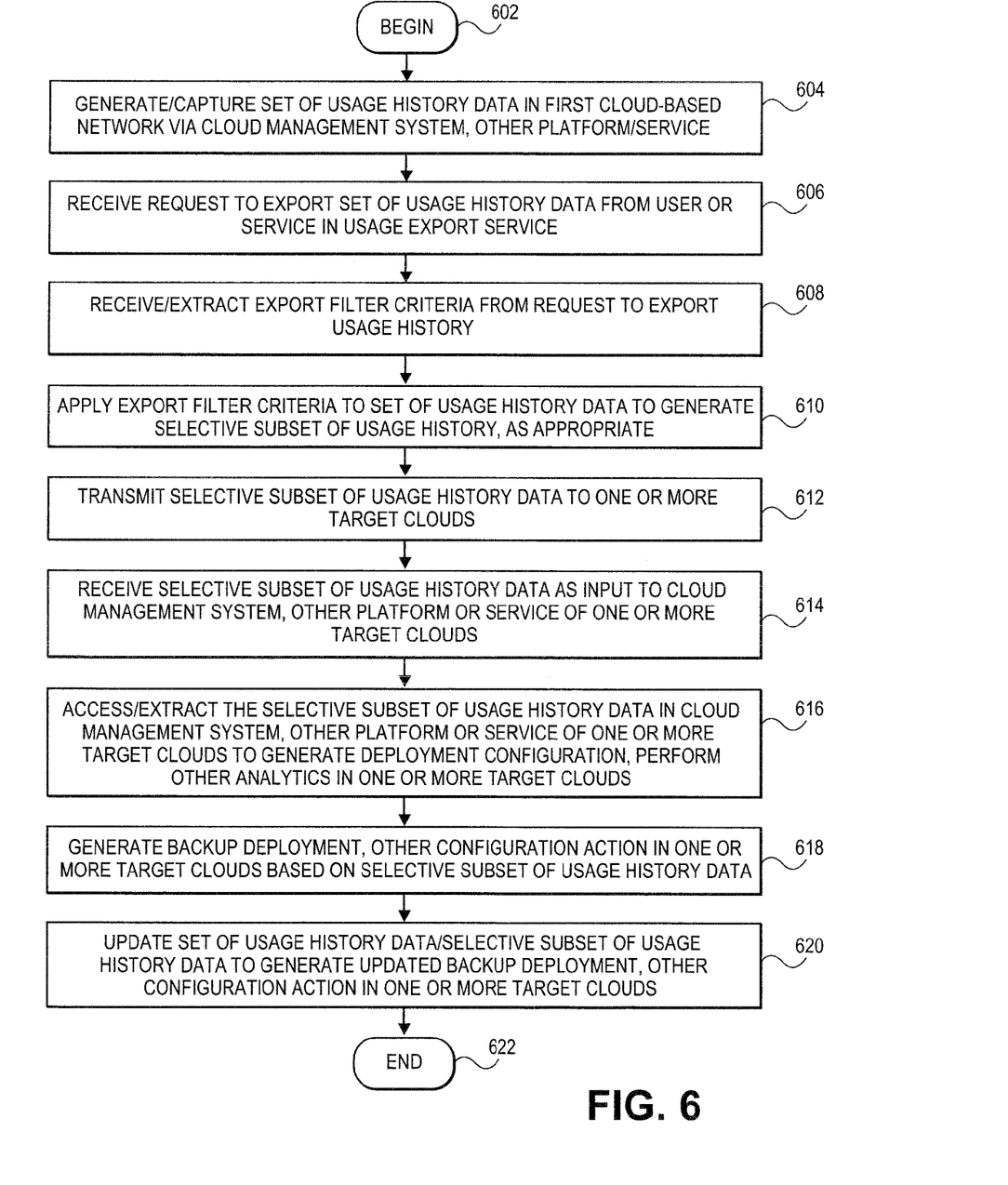
FIG. 6 illustrates a flowchart for processing the capture, management and exporting of usage history data in across multiple clouds in a cloud computing environment, according to various embodiments.

FIG. 6 illustrates a flowchart of overall processing to generate and manage services for the monitoring and exporting of utilization data from a host cloud 166 to one or more target clouds 168, according to various embodiments of the present teachings. In 602, processing can begin. In 604, the cloud management system 104 of the host cloud 166, the usage export service 142, and/or other logic can generate and/or capture the set of usage history data set of usage history data 144 reflecting the consumption of hardware and/or software resources by the set of host virtual machines 172 operating in the host cloud 166. In aspects, the set of usage history data set of usage history data 144 can reflect the use or consumption of hardware resources in the host cloud 166, such as, for example, the use of processor time, cycles, or throughput, the use of memory such as electronic random access memory (RAM), or the use of storage resources or facilities. In aspects, the set of usage history data set of usage history data 144 can in addition or instead reflect the use or consumption of communications resources, such as the number or identity of ports, pipes, channels, and/or other connections established or used by the set of host virtual machines 172. In aspects, the set of usage history data set of usage history data 144 can in addition or instead reflect the use or consumption of software resources, such as the number of instances of one or more applications, and/or the number of images of an operating system used in the set of host virtual machines 172. In aspects, the set of usage history data set of usage history data 144 can reflect the use or consumption of services in the host cloud 166, such as, for example, the accessing or use of authentication or security services, the accessing or use of messaging or media services, and/or the accessing or use of other services by or via the set of host virtual machines 172. The set of usage history data set of usage history data 144 can include a record of the consumption or use of other resources hosted by the host cloud 166 and/or accessed by or via the set of host virtual machines 172. In aspects, the cloud management system 104 of the host cloud 166, the usage export service 142, and/or other logic can store the set of usage history data set of usage history data 144 to the usage database 140, and/or other local or remote storage.

In 606, the usage export service 142 can receive a request and/or command to export the set of usage history data set of usage history data 144 and/or a selective subset of the usage history data 156 from a user of workstation 160, and/or from a service or application in the host cloud 166. In 608, the usage export service 142 can receive and/or extract a set of export criteria 158 from the user of workstation 160 and/or other source, to generate the selective subset of the usage history data 156, as appropriate. In 610, the usage export service 142 can apply the set of usage export filter criteria 158 to the set of usage history data set of usage history data 144 to generate the selective subset of the usage history data 156, as appropriate. In 612, the usage export service 142 can transmit the selective subset of the usage history data 156 to the one or more target clouds 168, as appropriate. In 614, the selective subset of the usage history data 156 can be received as an input to the cloud management system 104 and/or other management platform or service of the one or more target clouds 168. In 616, the selective subset of the usage history data 156 can be accessed and/or extracted in the cloud management system 104 and/or other management platform or service of the one or more target clouds 168 to generate a deployment or configuration action in the set of target virtual machines 178, and/or perform other analytics on the one or more target clouds 168.

In 618, the cloud management system 104 and/or other platform or service of the one or more target clouds 168 can generate a backup deployment, configure a fail-over service, and/or perform other configuration or management action(s) in the one or more target clouds 168 based on the selective subset of the usage history data 156. In 620, the usage export service 142 and/or other platform or logic can update the set of usage history data 144 and/or selective subset of the usage history data 156 to generate an updated backup deployment, and/or perform other configuration or management actions in the one or more target clouds 168 via the cloud management system 104 of the one or more target clouds 168, as appropriate. In 622, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, set of virtual machines 178, and/or other machines, entities, services, or resources. For further example, while embodiments have been described in which one usage export service 142 operates to access, track, and manage the usage history including the profile of a user's consumption of software and hardware resources in the host cloud 166, in embodiments, multiple usage exporting services can operate and cooperate to maintain and transfer usage data on a cross-cloud, cross-vendor, or other basis. Other resources described as singular or integrated can in embodiments be plural or distributed, and resources described as multiple or distributed can in embodiments be combined. The scope of the invention is accordingly intended to be limited only by the following claims.

What is claimed:

1. A method comprising:
   accessing, by a processor, a usage history representing at least one of consumption of resources or usage of software in a host cloud-based network from a management platform of the host cloud-based network;
   receiving, by the processor, a set of export filter criteria;
   applying, by the processor, the set of export filter criteria to the usage history to generate at least a selective subset of the usage history; and
   exporting, by the processor, the selective subset of the usage history to a management platform of a target cloud-based network, wherein the export filter criteria is received from a service operating in the target cloud-based network, and wherein the management platform of the host cloud-based network and the management platform of the target cloud-based network interface to operate the host cloud-based network and the target cloud-based network on a combined basis to enable the management platform of the host cloud-based network to manage resources on the target cloud-based network and the management platform of the target cloud-based network to manage resources on the host cloud-based network.

2. The method of claim 1, wherein the usage history of the host cloud-based network is captured by a cloud management system of the host cloud-based network.

3. The method of claim 1, wherein the management platform of the target cloud-based network comprises a cloud management system of the target cloud-based network.

4. The method of claim 1, wherein the usage history comprises a set of data indicating at least one of usage time of the software, a number of instances of the software, a number of registered users of the software, a number of support events associated with the software, an amount of bandwidth associated with usage of the software, or an amount of data consumption associated with the software.

5. The method of claim 1, wherein the export filter criteria is received via user input.

6. The method of claim 1, wherein at least a portion of the data in the usage history is accessed from a set of vendor repositories hosted in the host cloud-based network.

7. The method of claim 1, wherein the usage history comprises at least one of a billing or subscription report.

8. A system comprising:
   a network interface to a host cloud-based network; and
   a processor, to communicate with the host cloud-based network via the network interface, the processor to:
   access a usage history representing at least one of consumption of resources or usage of software in the host cloud-based network from a management platform of the host cloud-based network,
   receive a set of export filter criteria,
   apply the set of export filter criteria to the usage history to generate at least a selective subset of the usage history, and
   export the selective subset of the usage history to a management platform of a target cloud-based network, wherein the export filter criteria is received from a service operating in the target cloud-based network, and wherein the management platform of the host cloud-based network and the management platform of the target cloud-based network interface to operate the host cloud-based network and the target cloud-based network on a combined basis to enable the management platform of the host cloud-based network to manage resources on the target cloud-based network and the management platform of the target cloud-based network to manage resources on the host cloud-based network.

9. The system of claim 8, wherein the usage history of the host cloud-based network is captured by a cloud management system of the host cloud-based network.

10. The system of claim 8, wherein the management platform of the target cloud-based network comprises a cloud management system of the target cloud-based network.

11. The system of claim 8, wherein the usage history comprises a set of data indicating at least one of usage time of the software, a number of instances of the software, a number of registered users of the software, a number of support events associated with the software, an amount of bandwidth associated with usage of the software, or an amount of data consumption associated with the software.

12. The system of claim 8, wherein the export filter criteria is received via user input.

13. The system of claim 8, wherein at least a portion of the data in the usage history is received from a set of vendor repositories hosted in the host cloud-based network.

14. The system of claim 8, wherein the usage history comprises at least one of a billing or subscription report.

15. A method comprising:
transmitting, by a processor, from a target cloud-based network, a set of export filter criteria to a host cloud-based network;
receiving, by the processor, from a management platform of the host cloud-based network, a selective subset of a usage history representing at least one of consumption of resources or usage of software in the host cloud-based network in a management platform of the target cloud-based network; and
generating, by the processor, a management action in a set of virtual machines in the target cloud-based network, wherein the export filter criteria is transmitted by a service operating in the target cloud-based network, and wherein the management platform of the host cloud-based network and the management platform of the target cloud-based network interface to operate the host cloud-based network and the target cloud-based network on a combined basis to enable the management platform of the host cloud-based network to manage resources on the target cloud-based network and the management platform of the target cloud-based network to manage resources on the host cloud-based network.

16. The method of claim 15, wherein the management action comprises at least one of instantiating or configuring a set of virtual machines in the target cloud-based network.

17. The method of claim 16, wherein the set of virtual machines in the target cloud-based network are instantiated or configured in response to at least one of a failure event in the host cloud-based network or reaching a capacity limit in the host cloud-based network.

18. The method of claim 15, wherein the management action comprises aggregating the selective subset of the usage history with a set of usage history data in the target cloud-based network.

\* \* \* \* \*